(12) United States Patent
Zhou et al.

(10) Patent No.: US 7,003,747 B2
(45) Date of Patent: Feb. 21, 2006

(54) METHOD OF ACHIEVING TIMING CLOSURE IN DIGITAL INTEGRATED CIRCUITS BY OPTIMIZING INDIVIDUAL MACROS

(75) Inventors: Jun Zhou, Poughkeepsie, NY (US); David J. Hathaway, Underhill Center, VT (US); Chandramouli Visweswariah, Croton-on-Hudson, NY (US); Patrick M. Williams, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 150 days.

(21) Appl. No.: 10/435,824

(22) Filed: May 12, 2003

(65) Prior Publication Data

US 2004/0230929 A1    Nov. 18, 2004

(51) Int. Cl.
   *G06F 17/50*    (2006.01)
(52) U.S. Cl. .................... 716/6; 716/4; 716/5
(58) Field of Classification Search .............. 716/4–14, 716/18; 703/2; 700/28–34
   See application file for complete search history.

(56) References Cited

U.S. PATENT DOCUMENTS

| | | | |
|---|---|---|---|
| 4,495,559 A * | 1/1985 | Gelatt, Jr. et al. ............. 700/28 |
| 4,698,760 A * | 10/1987 | Lembach et al. ............... 716/6 |
| 6,327,552 B1 * | 12/2001 | Nemani et al. ................. 703/2 |
| 6,408,428 B1 * | 6/2002 | Schlansker et al. ........... 716/17 |
| 6,480,991 B1 * | 11/2002 | Cho et al. ...................... 716/8 |
| 6,591,407 B1 * | 7/2003 | Kaufman et al. ............. 716/10 |
| 6,766,504 B1 * | 7/2004 | Rahut et al. .................. 716/13 |
| 6,826,733 B1 * | 11/2004 | Hathaway et al. ............. 716/2 |
| 2004/0158807 A1 * | 8/2004 | Hossaon et al. .............. 716/18 |
| 2004/0243964 A1 * | 12/2004 | McElvain et al. ............ 716/12 |

OTHER PUBLICATIONS

"Custom Circuit Design as a Driver of Microprocessor Performance", D. H. Alien et al., http://www.research.ibm-.com/journal/rd/446/allen.html.
"Themistor Macro", Thermistor Macro—Fall 1998, http://www.spectrum-soft.com/news/fall98/therm.shtm.

* cited by examiner

*Primary Examiner*—Matthew Smith
*Assistant Examiner*—Naum Levin
(74) *Attorney, Agent, or Firm*—Lynn L. Augspurger

(57) ABSTRACT

Disclosed is a method for enhanced efficiency and effectiveness in achieving timing closure of large, complex, high-performance digital integrated circuits. Circuit macros are re-optimized and re-tuned in the timing closure loop by means of a reformulated objective function that allows the optimizer to improve the slack of all signals rather than just the most critical one(s). The incentive to improve the timing of a sub-critical signal is a diminishing function of the criticality of the signal. Thus all signals are improved during the optimization, with the highest incentive to improve on the most critical signals, leading to faster and more effective overall timing closure.

1 Claim, 3 Drawing Sheets

METHOD OF ACHIEVING TIMING CLOSURE IN DIGITAL INTEGRATED CIRCUITS BY OPTIMIZING INDIVIDUAL MACROS

RELATED APPLICATIONS

D. J. Hathaway, L. K. Lange, C. Visweswariah and P. M. Williams, "Method of optomizing and alalyzing selected portions of a digital integrated circut," filed may 12, 2003 under U.S. Ser. No. 10/436,213. E. K. Cho, D. J. Hathaway, M. Hsu, L. K. Lange, G. A. Northrop, C. Visweswariah, C. Washburn, P. M. Williams, J. Zhou, "A Method for Tuning a Digital Design for Synthesized Random Logic Circuit Macros in a Continuous Design Space with Optimal Insertion of Multiple Threshold Voltage Devices," filed as a continuation in part claiming priority U.S. Ser. No. 10/436, 213 of May 12, 2003 under U.S. Ser. No. 10/842,589.

FIELD OF THE INVENTION

This invention relates to the design, and automation thereof, of high-performance digital integrated circuits. The invention is particularly directed to the problem of obtaining timing closure of entire integrated circuits or functional units of an integrated circuit by optimizing or tuning individual macros that constitute the functional unit or integrated circuit.

These co-pending applications and the present application are owned by one and the same assignee, International Business Machines Corporation of Armonk, N.Y.

The descriptions set forth in these co-pending applications are hereby incorporated into the present application by this reference.

Trademarks: IBM® is a registered trademark of International Business Machines Corporation, Armonk, N.Y., U.S.A. Other names may be registered trademarks or product names of International Business Machines Corporation or other companies.

BACKGROUND

Achieving timing closure of high-performance digital integrated circuits (or functional units of a high-performance digital integrated circuit) implies obtaining sufficient timing performance from the design. This may mean, for example, being able to operate the clock fast enough to obtain the required performance while guaranteeing functional correctness. Achieving timing closure is an important, iterative and time-consuming step in the design of any digital integrated circuit. Particularly in microprocessor designs, timing requirements, logic requirements and technology parameters are often changed late in the design cycle, making automated design closure techniques extremely valuable.

Prior-art methods are illustrated in FIG. 1 (flow 100). Because the overall design is too large and complex to optimize at once, prior-art methods typically divide the design into partitions called macros, and assign to each individual macro a timing and area budget by a process of apportionment (box 110). Then each macro is designed or the design is refined with the goal of meeting its budget, either by a process of automated synthesis or by means of custom design techniques (box 120). The optimization at this stage takes many forms such as logic re-structuring, buffer insertion, transistor sizing and use of low threshold voltage devices. The resulting design is timed, typically by means of static timing analysis (box 130). If every macro meets its budget, it is obvious that timing closure is achieved and the design is complete (box 150). More typically, the apportionment process is imperfect and involves some conjecture and guesswork. Hence, several macros will not meet their budgets, and overall timing closure is not achieved, as detected by box 140. In this case, the apportionment process is repeated (box 110), individual macros are then redesigned and/or re-optimized (box 120), and the resulting overall design is timed (box 130), and this process iteratively repeated until timing closure is obtained (box 150), as depicted in FIG. 1.

The main difficulty in prior-art techniques is that the application of automatic optimization techniques on individual macros interferes with the achievement of overall timing closure. This problem is illustrated in FIG. 2. Consider the simple case of macro A (box 200) feeding macro B (box 210). A short path of delay 200 time units of macro A feeds a long path of delay 600 time units of macro B. A different long path of delay 600 time units of macro A feeds a different short path of delay 200 time units of macro B, as shown in FIG. 2. Assume that all output signals are required to be available by time 700. In this case, the initial design is missing timing closure by 100 time units, or, in other words, the initial design has a slack of −100 time units. Slack is defined as the algebraic difference between required arrival time (RAT) and actual arrival time (AT). One particular prior-art apportionment technique will assign this negative slack of 100 time units to each of the two macros, giving the optimization procedures applied to each macro the opportunity to see and correct the entire negative slack of the global path. Using this apportionment method, the required arrival times will be 100 and 500 at the upper and lower outputs of macro A, respectively, and 700 at both the upper and lower outputs of macro B, and the arrival times will be zero at both the upper and lower inputs of macro A, and 200 and 600 at the upper and lower inputs of macro B, respectively, as shown in the Figure.

Suppose the short paths cannot be improved, but there is room for improvement in the long paths. It is clear from this example that improving the two long paths from 600 to 500 units will achieve overall timing closure. Unfortunately, prior-art methods will never achieve timing closure in this case, since the redesign and re-optimization of individual macros typically target the worst slack, and because the short paths cannot be improved, the redesign and re-optimization techniques have no incentive to improve the delay of the long paths.

Another prior-art apportionment method, one iteration of which is illustrated in FIG. 3, would divide the negative slack according to the fraction of the global path delay suffered in each macro, and in the example of FIG. 2, would assign −25 time units of the upper path slack to macro A, −75 of the upper path slack to macro B, −75 of the lower path slack to macro A, and −25 of the lower path slack to macro B. Using this apportionment method, the required arrival times will be 175 and 525 at the upper and lower outputs of macro A, respectively, and 700 and 700 at both the upper and lower outputs of the second macro B, and the arrival times will be zero at both the upper and lower inputs of macro A, and 175 and 525 at the upper and lower inputs of macro B, respectively. The situation after one iteration is depicted in FIG. 3.

Suppose now that each of the delays through each of the macros can be decreased by 50 units by optimization. Again, prior-art methods will never achieve timing closure under this apportionment scheme, since the redesign and re-optimization of individual macros typically target the worst slack, and because the long paths cannot be improved beyond 550, the redesign and re-optimization techniques have no incentive to improve the delay of the short paths, and upon successive iterations through loop of FIG. 1, the delays and targets will be adjusted by decreasing amounts, and will asmyptotically approach but not reach timing closure.

With this second prior-art apportionment method, if the long paths in each macro can be improved by 100 units each, and the short paths cannot be improved at all, it is clear that although an easy solution exists for global timing closure, the iteration of FIG. 1 will not converge to the solution in reasonable time. The reason is that the short path's stubborn negative slack at each iteration of FIG. 1 will limit the improvement that is targeted for the long path of each macro.

Irrespective of the apportionment method employed, the crux of the problem is that prior-art optimization techniques target only paths with the worst slack and therefore do not improve sub-critical slacks even though such actions would help achieve timing closure from a global vantage point. Improving sub-critical paths also makes it easier downstream in the methodology to focus design efforts in limited areas of the circuit to obtain timing convergence. Thus the formulation of the objective function during individual macro optimization has the unwanted consequence of preventing or impeding overall timing convergence.

It is to be appreciated that this simple example merely illustrates the problem. With a large number of macros and a large number of interconnections between them, the problem is exacerbated and achievement of timing closure becomes an extremely hard problem, leading to costly redesign efforts and increased time-to-market of the product.

SUMMARY OF THE INVENTION

This invention relates to an improved method for achieving timing closure. During the design iterations, focusing solely on the most critical (or limiting) slack inhibits overall timing closure. Instead, this invention reformulates the objective of the redesign and re-optimization phase so that there is an incentive during automatic optimization to improve not only the arrival time of the most critical signals, but other sub-critical signals as well. Instead of the prior-art focus on the most critical signal or signals, the inventive method creates an incentive to optimize the arrival time of every output signal, the incentive being proportional to the criticality of the signal. Thus once the most critical signals cannot be further improved, sub-critical signals are improved, leading to more efficient and effective overall timing closure.

These and other improvements are set forth in the following detailed description. For a better understanding of the invention with advantages and features, please refer to the detailed description and to the drawings.

Figure 1:
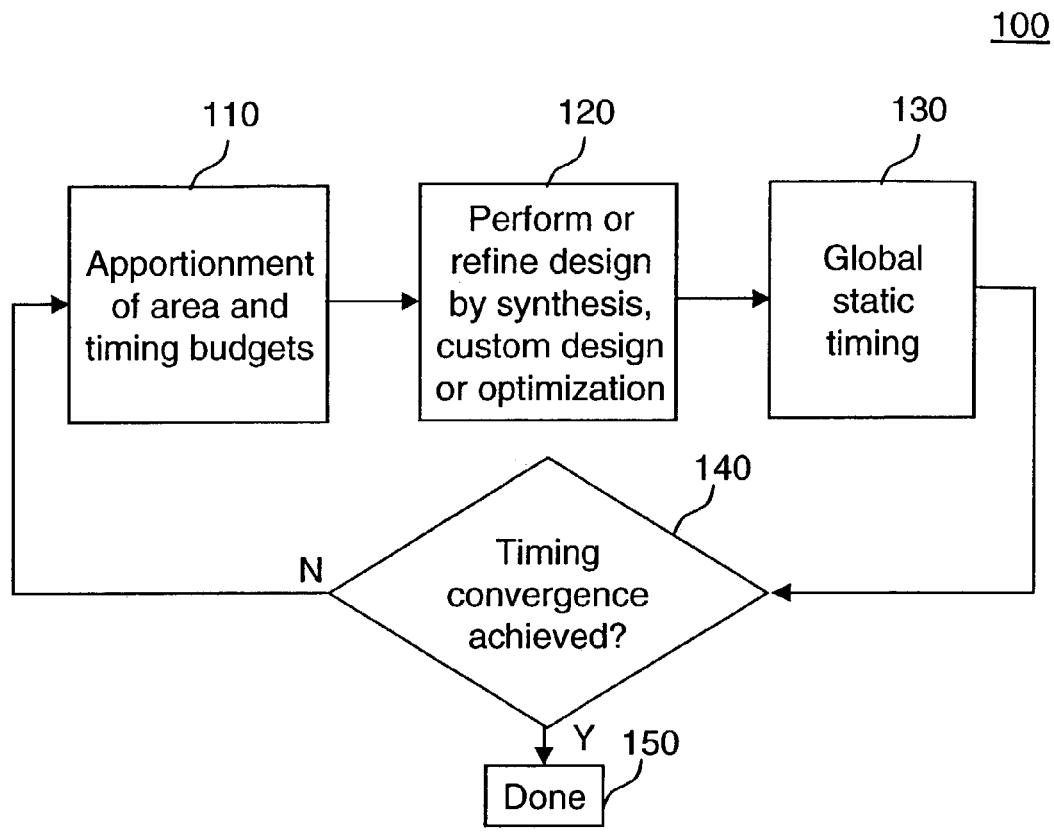
FIG. 1 illustrates a typical prior-art iterative procedure for achieving timing closure of a high-performance digital integrated circuit or functional unit of a high-performance digital integrated circuit.

Our detailed description below explains the preferred embodiments of out invention, together with advantages and features, by way of example with reference to the drawings.

DETAILED DESCRIPTION OF THE INVENTION

The heart of the invention is the reformulation of the objective function of any optimization that is performed by automatic means to improve individual macros. The reformulation makes the overall timing closure loop more effective and efficient. Traditional circuit optimization tools such as EinsTuner formulate the optimization problem in one of two ways, as described below. A description of EinsTuner is available in A. R. Conn, I. M. Elfadel, W. W. Molzen, Jr., P. R. O'Brien, P. N. Strenski, C. Visweswariah and C. B. Whan, "Gradient-based optimization of custom circuits using a static-timing formulation," Proceedings of the 1999 Design Automation Conference, June 1999, pages 452–459. The description below assumes a simple combinational circuit to illustrate the detailed description of the invention. It is to be understood that the formulation can easily be extended to situations containing sequential elements including all types of latches and possibly multiple clocks by one of skill in the art.

It is to be noted that the reformulation of the objective function is being demonstrated by means of the example of transistor sizing by a formal, mathematical optimizer. However, the inventive method is applicable to any type of circuit change such as logic restructuring, buffering or use of low threshold voltage devices, and to any optimization method such as heuristic optimization, linear programming, nonlinear programming, branch-and-bound, dynamic programming or simulated annealing, provided the method of optimization makes use of an objective (or "cost" or "merit") function that is to be minimized. The inventive method simply reformulates that objective function.

The first traditional formulation is delay minimization in which the problem is formulated as follows:

$$\min z$$

$$\text{s.t. } z \geq AT_i - RAT_i, \ i=1,2,\ldots,n$$

where z is an auxiliary optimization variable representing the negative slack of the circuit, n is the number of primary output signals of the combinational circuit, $AT_i$ and $RAT_i$ are the arrival time and required arrival time of the $i^{th}$ primary output signal. It is to be understood that many other constraints like area and slew constraints are required to render the results of the optimization practical, but the simplistic formulation above serves to illustrate a point. At optimality, z is larger than the negative of the worst slack among all the primary outputs, and has the smallest possible value, hence the circuit has the smallest possible negative slack, or equivalently, the largest possible positive slack. It is clear that such a formulation will lead to a large number of equally critical paths, as explained in the above-mentioned Design Automation reference. Further, it is clear that if there is a limiting signal whose slack cannot be further improved, optimization based on this prior-art formulation has no incentive to improve any signal with a slack worse than the limiting signal's slack.

The second traditional formulation is area minimization, in which the problem is formulated as follows:

min area s.t. $AT_i \leq RAT_i$-desired_slack, i=1,2, ..., n where the area of the circuit is minimized subject to timing constraints, and desired_slack represents an (algebraic) additional slack required by the user. Using desired_slack merely provides a notational convenience, since the required arrival times could be modified to reflect the additional desired slack. Note that a positive required_slack value makes the problem more difficult to solve. It is clear that even in this second formulation, a large number of equally critical paths will result, especially since area is "stolen" from sub-critical paths to speed up critical paths. Further, once a primary output signal achieves its timing requirement, there is no further incentive to improve its timing.

Thus, both traditional optimization formulations described above do not solve the problem of encouraging the optimizer to pay attention to sub-critical paths. Instead, this invention proposes a new formulation of the objective function as follows:

$$\sum_{i=1}^{n} f(-slack_i) = \sum_{i=1}^{n} f(-(RAT_i - AT_i - \text{desired\_slack}))$$

where f is a penalty function and $slack_i$ is the effective slack of the $i^{th}$ primary output, taking desired_slack into account. Thus the negative slack of each and every primary output is represented in the objective function. The key decision to be made is the choice of the function f, since it is desired that the signals that are most critical contribute the most to the objective function, thus giving the optimizer the most incentive to improve the timing of such signals. At the same time, if those signals cannot be improved any more, it is desired that sub-critical signals also have substantial contribution to the objective function, thus incenting the optimizer to improve their timing properties as well. Clearly, f should be a decreasing function of its argument. If applied in a formal mathematical continuous optimizer, f should preferably be a smooth, continuous and continuously differentiable function.

In a preferred version of this invention, the choice of f is as follows:

$$f(x) = \exp\left(3 + \frac{5x}{|\text{worst\_starting\_slack}|}\right)$$

Figure 5:
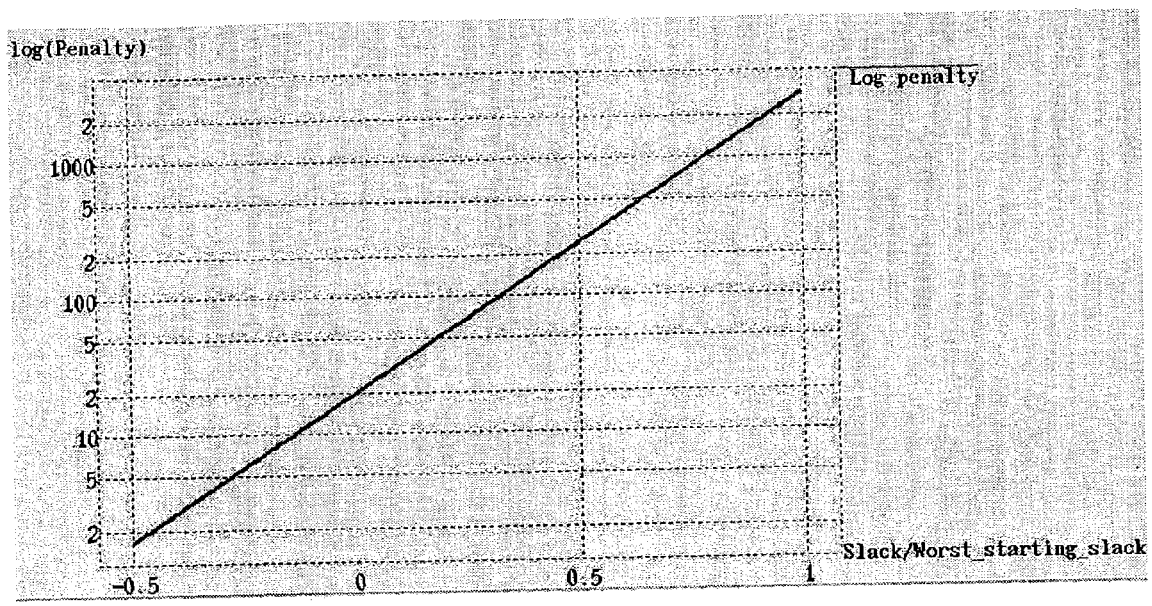
FIG. 5 illustrate the dependence of the logarithm of the penalty contributed by a signal on its criticality, using the preferred objective function reformulation.

At the start of the optimization, the limiting primary output will have a slack equal to the worst_starting_slack (usually a negative number), and hence the contribution of this signal to the objective function is exp(8). As the optimization progresses, if a primary output signal achieves its timing requirement, the effective slack is 0, hence the contribution to the objective function is exp(3). If the timing of this signal further improves, the contribution to the objective function gets smaller, and the rate of decrease in the contribution to the objective function per unit of timing improvement also decreases. In the meanwhile, even if a signal does not achieve its timing requirements, there is sufficient incentive on sub-critical signals to improve their timing characteristics, since every signal contributes a term to the objective function. That term gets smaller as timing requirements are closer to being met. FIG. 5 shows the variation of f with its argument (negative of the effective slack), and FIG. 6 shows the same data on a logarithmic scale.

Figure 2:
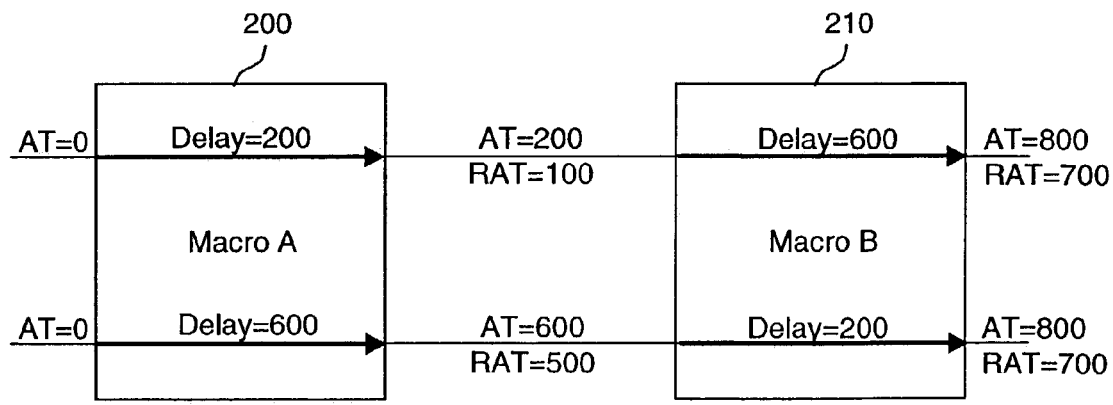
FIG. 2 illustrates an example situation in which prior-art optimization techniques will lead to inefficient achievement of timing closure, or not achieve timing closure at all.
Figure 3:
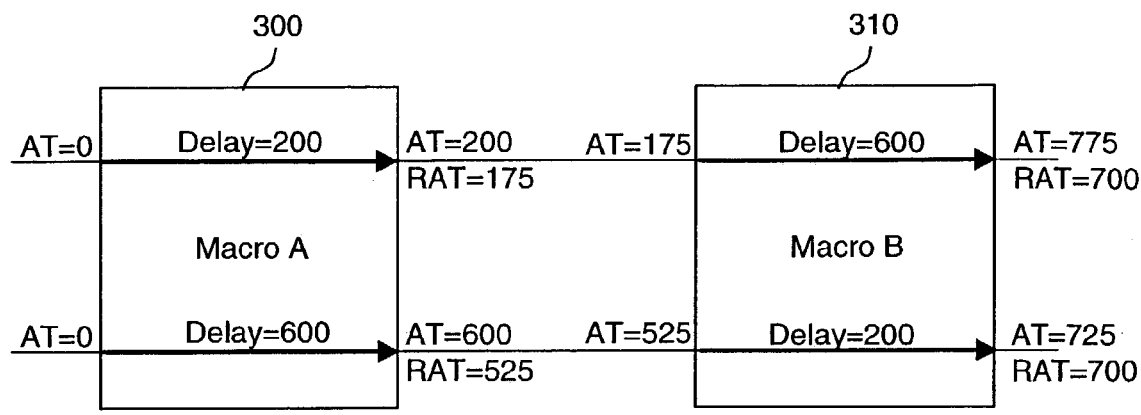
FIG. 3 illustrated the same example situation as FIG. 2, but with application of one iteration of a second prior-art apportionment scheme; again, prior-art optimization techniques will not achieve timing closure.
Figure 4:
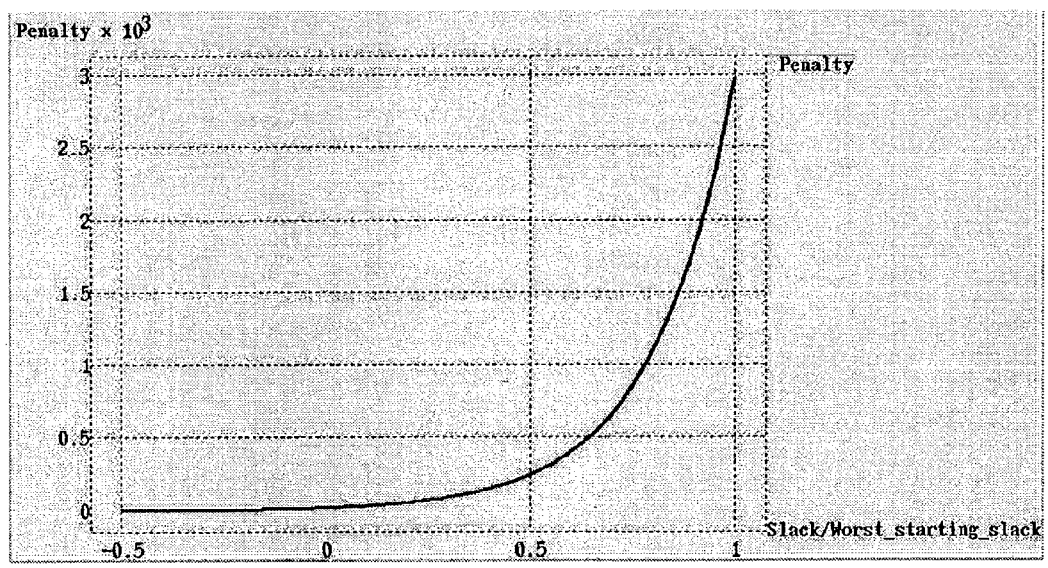
FIG. 4 illustrates the dependence of the penalty contributed by a signal on its criticality, using the preferred objective function reformulation.

Applying this method to the simple example of FIG. 2, we see that even though the "short path" cannot be improved in the two individual macros being tuned, there is sufficient incentive to improve the long paths even though they are non-limiting paths, and the overall loop moves towards timing closure.

Figure 6:
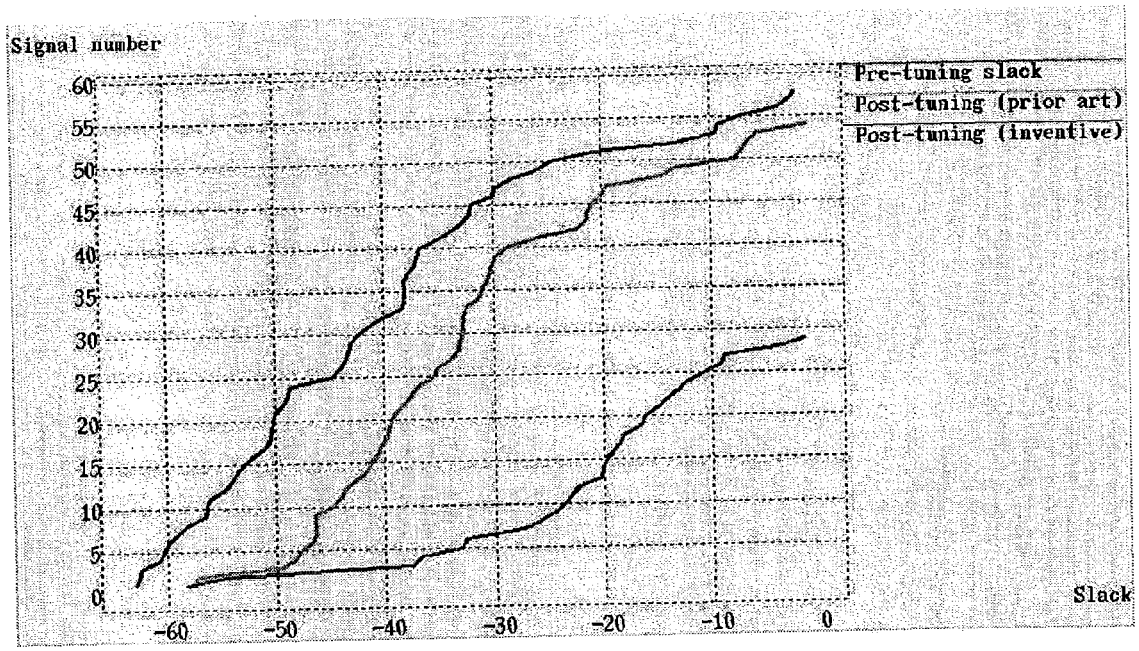
FIG. 6 illustrates an example slack histogram showing the slack histogram before optimization, after optimization with prior-art formulation of the objective function and after optimization with the inventive objective function reformulation.

Typical results obtained by using this invention on a sample individual macro are shown in the slack histogram of FIG. 6. In a slack histogram, the horizontal axis represents slack, and the vertical axis value of a point on the curve represents the number of paths with that slack or better. It is clear that traditional optimization has no incentive to improve sub-critical paths. The inventive method not only improves the limiting slack of the macro, it also improves the timing characteristics of each and every signal with an incentive proportional to its respective criticality.

One reason to reformulate the objective function is to obtain more "separation," where separation is the difference between the slack of a sub-critical path and the overall slack of the macro. This separation has beneficial properties in obtaining global timing convergence, as taught by this invention. It is to be noted that another reason to obtain separation is to be relatively immune to downstream changes in the design, modeling or manufacturing of the circuit, as disclosed in X. Bai, D. J. Hathaway, P. N. Strenski, and C. Visweswariah, "Parameter-Variation Tolerant Method for Circuit Design Optimization," U.S. Pat. No. 6,826,733, issued Nov. 30, 2004. In that invention, penalty terms were added to the traditional objective function to obtain separation in order to be tolerant to downstream changes or modeling uncertainties. In contrast, the objective function in this invention is reformulated to obtain separation while simultaneously incenting the optimizer to work hardest on the most critical path(s) in order to enhance timing convergence at the functional-unit or chip-level. The uncertainty-awareness and all the benefits thereof that are obtained by increased separation are preserved by the present invention.

The commercial application of our invention can be applied to any type of formal or heuristic optimization which requires the formulation of an objective function; it can be applied to any type of circuitry that is amenable to static timing analysis; it can be extended to application having master-slave latches, transparent latches, multi-cycle clocks, multi-frequency clocks and dynamic circuits.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method of achieving the timing convergence of one of a digital integrated circuit and a functional unit of a digital integrated circuit comprising of the steps of:
   partitioning a design into macros;
   apportioning a timing and area budget to each of said macros;
   creating an objective function for an optimization of the at least one of said macros having contributions from a plurality of primary output signals in said macro;
   improving the timing characteristics of each of the at least one selected macros by attempting to minimize said objective function;
   timing the overall design; and
   re-apportioning the timing and area budgets and repeating the said improving and timing steps until the required specifications are met; and
   in which the objective function comprises a summation of penalty contributions from each primary output siqnal, each of said penalty contributions being a non-decreasing penalty function of the the amount by which a timing requirement is violated in which said penalty function is a weighted and shifted exponential function of said violation amount.

* * * * *